United States Patent [19]

Strong

[11] Patent Number: 5,034,712

[45] Date of Patent: Jul. 23, 1991

[54] MAGNETIC HEADING SENSOR ALIGNMENT

[75] Inventor: David N. Strong, East Hadam, Conn.

[73] Assignee: The United States of America as represented by the Secretary of the Navy, Washington, D.C.

[21] Appl. No.: 548,655

[22] Filed: Jul. 5, 1990

[51] Int. Cl.$^5$ .......................... H01F 1/00; G01S 3/80; G01R 33/00

[52] U.S. Cl. ................................ 335/209; 33/355 R; 174/101.5; 248/603; 267/160; 361/419; 324/262; 367/130; 367/153

[58] Field of Search ................ 174/101.5; 248/225.31, 248/153, 603, 146; 267/160, 164; 33/355 R; 361/417, 419; 324/202, 226, 262; 138/112, 113, 114; 367/19, 33, 35, 130, 153, 154; D32/21, 23, 24; 15/327.1, 327.7

Primary Examiner—Leo P. Picard
Assistant Examiner—Ramon M. Barrera
Attorney, Agent, or Firm—Michael J. McGowan; Prithvi C. Lall; Michael F. Oglo

[57] ABSTRACT

A magnetic heading sensor alignment device for an acoustic towed line array is described. It includes a generally cylindrical non-magnetic piece having a longitudinal opening along its central axis to accommodate the heading sensor. A plurality of longitudinal non-magnetic strips or springs are provided around the cylindrical piece by securing them at the ends of the cylindrical piece to form a cage. This provides a spring-like action when the alignment device including the heading sensor is inserted inside the hose of the towed line array and thus keep the heading sensor aligned during the deployment of the acoustic towed array.

5 Claims, 2 Drawing Sheets

5,034,712

MAGNETIC HEADING SENSOR ALIGNMENT

STATEMENT OF GOVERNMENT INTEREST

The invention described herein may be manufactured and used or for the Government of the United States of America for government purposes without the payment of any royalties thereon or therefor.

BACKGROUND OF THE INVENTION

1. Field of the Invention

This invention is directed to acoustic towed arrays and more specifically to a sensor alignment device for accurate positioning of magnetic heading sensor modules in towed line arrays.

2. Statement of the Prior Act

Towed line arrays are used extensively in submarines, surface ships and oil exploration for detection purposes. A towed acoustic line array includes a liquid-filled hose containing a linear array of hydrophones for sound detection and magnetic heading sensors. These hydrophones and magnetic heading sensor are distributed inside the hose in a predetermined configuration together with their associated electronics including their power Sources. These sensors are of different types depending upon the requirements put upon the towed line arrays. The towed line arrays form an acoustic beam pattern which is used for the detection of targets in the area under surveillance. Additionally, it is important to determine accurately the position of the acoustic sensors and the towed line array as a function of time. A series of magnetic heading sensors distributed along the length of the towed line array are used for that purpose. It is desirable to have relatively small magnetic heading sensors for accurate position determination. A towed line array is formed from a long cable using various interconnecting acoustic sensors and magnetic heading sensors tied together. A mechanically rugged KEVLAR sheet or web is wrapped around the various elements, which is then placed inside a liquid filled hose. It is imperative to keep the magnetic heading sensors aligned within the hose and symmetrical with respect to the line passing through the center of the hose. Any misalignment of the magnetic heading sensors gives erroneous results. It is thus desirable to have a simple device which will maintain the positions of the magnetic heading sensors symmetrical with respect to the central axial line passing through the hose of the towed line array.

SUMMARY OF THE INVENTION

The objects and advantages of the present invention are accomplished by using a magnetic heading sensor alignment device according to the teachings of subject invention. The alignment device includes a plurality of non-magnetic longitudinal strips embedded in a non-magnetic cylindrical piece so that the strips provide a spring-like action when the alignment device is fitted tightly inside the hose of the towed line array. A longitudinal hole or opening throughout the center of the non-magnetic cylinder is provided for housing the magnetic heading sensor and its leads.

An object of subject invention is to have a magnetic heading sensor alignment device which is simple and effective.

Another object of subject invention is to use non-magnetic materials for the magnetic heading sensor alignment device.

Still another object of subject invention is to have a magnetic heading sensor device which is relatively easy to repair in the field.

Other objects, advantages and novel features of the invention will become apparent from the following detailed description thereof when considered in conjunction with the accompanying drawings wherein:

DESCRIPTION OF THE PREFERRED EMBODIMENT

Figure 1:
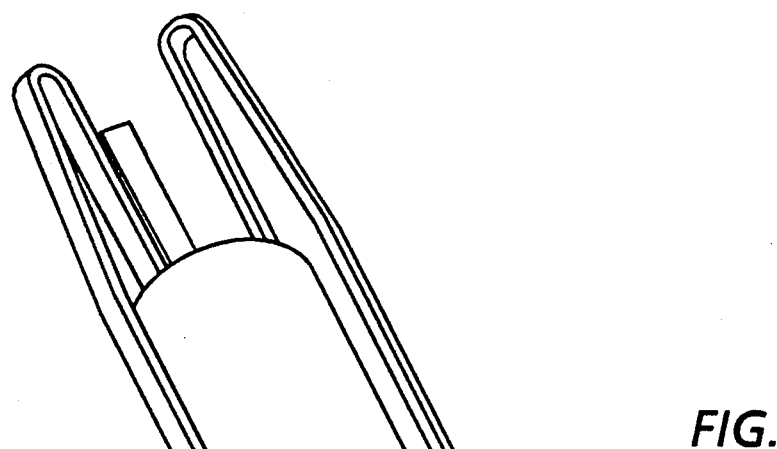
FIG. 1 is a perspective view of a magnetic heading sensor alignment device according to the teachings of subject invention.

Referring to the drawings wherein like reference characters designate identical or corresponding parts throughout various figures, FIG. 1 is a perspective view of a magnetic heading sensor alignment device 10 according to the teachings of subject invention. It includes a generally cylindrical piece 12 made of a non-magnetic material such as a plycarbonate (LEXAN). Piece 12 has ends 14 and 16 a longitudinal hole or opening 18 symmetrical around its central axis for housing the magnetic heading sensor and interconnecting lines to pass through. The alignment device also includes a plurality of non-magnetic strips or springs which form a cage-like structure around piece 12 and provide spring action when it is inserted inside the towed line array hose.

Figure 2:
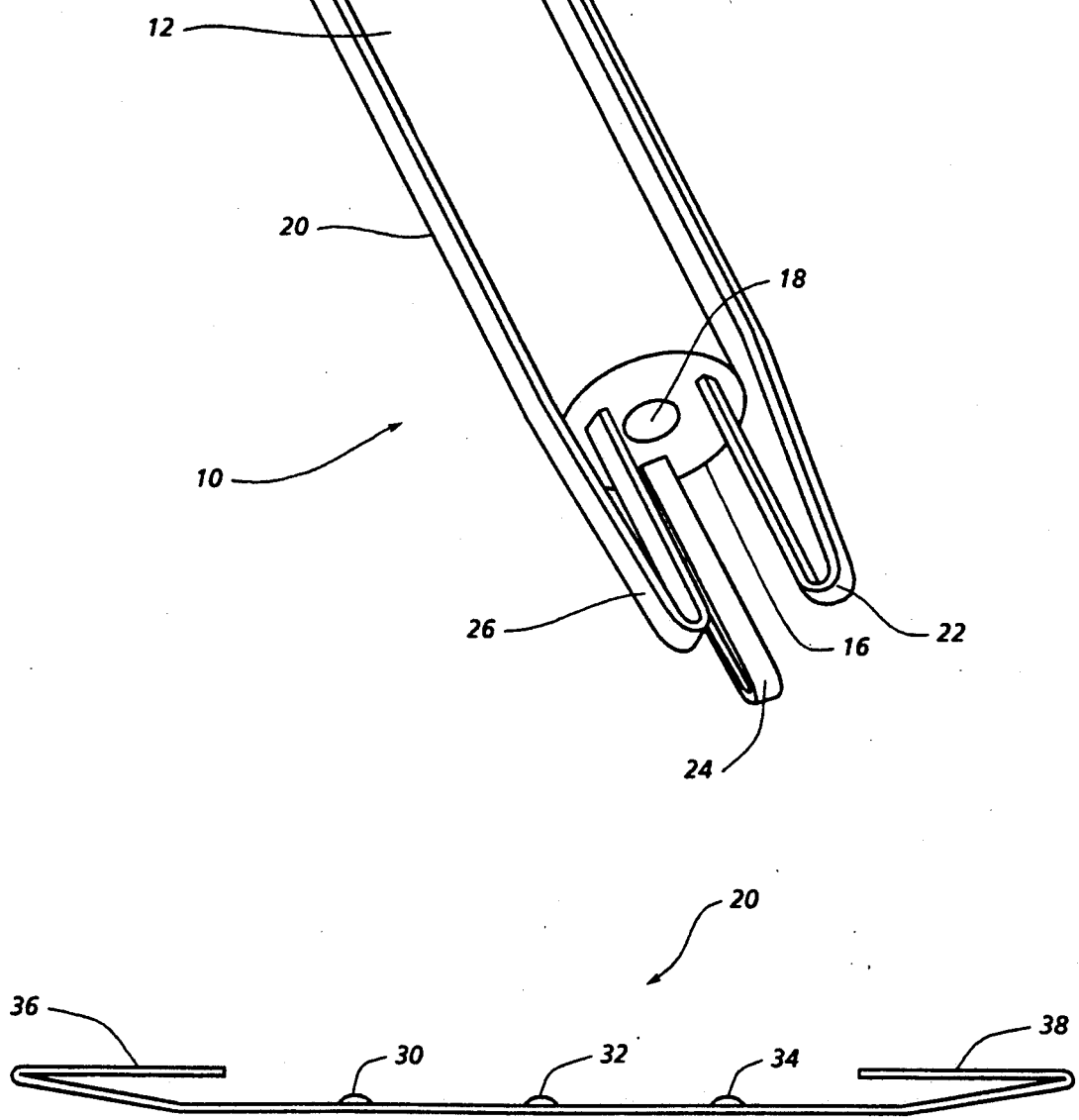
FIG. 2 is a perspective view of a non-magnetic spring or strip for fabricating the magnetic heading sensor alignment device.
Figure 4:
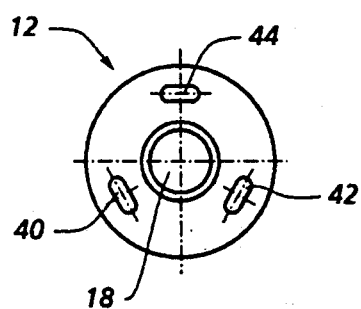
FIG. 4 is an end-view of the device of FIG. 1.

FIG. 2 shows perspectively one of the non-magnetic strips which is configured to form a spring 26. It is preferred to have three spring-like strips 20, 22 and 24 as shown in FIG. 1 and they are preferably made of full hard brass. Each of spring-like strips 20, 22, 24 has bends 30, 32 and 34 as shown in FIG. 2 to enhance spring action. End sections 36 and 38 of strip 20 as in FIG. 2 are used to insert them into respective drilled holes or grooves 40, 42 and 44 of FIG. 4 at end 14 of piece 12.

Figure 3:
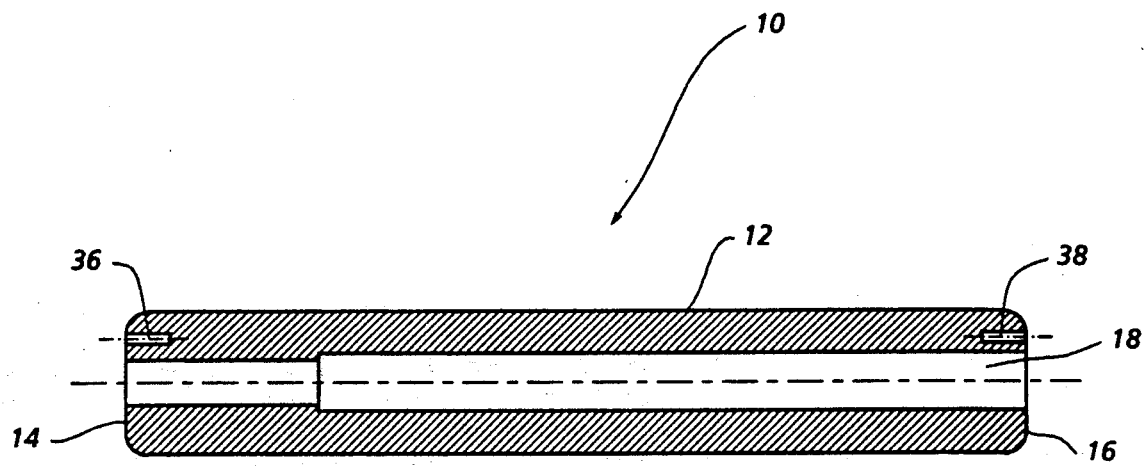
FIG. 3 is a cross-sectional view of the device of FIG. 1.

FIG. 3 is a cross-sectional view of the alignment device 10 after spring-like strips are in place at ends 14 and 16 of LEXAN piece 12.

The strips can be replaced very easily using a pair of pliers or the like, thus making the repairs easily possible in the field. This alignment device thus keeps the magnetic sensors of the towed line array in position under severe conditions during deployment of the towed array.

Briefly stated, a magnetic heading sensor alignment device in a towed line array is fabricated using a cylindrical piece of a non-magnetic material such as LEXAN which has a longitudinal hole or opening at the center for accommodating the magnetic heading sensor. A plurality of non-magnetic strips, preferably three strips made of full hard brass, are inserted into grooves at the two ends of the cylindrical piece so as to form a cage which fits tightly inside the hose of a towed line array.

From the foregoing description, one skilled in the art can easily ascertain the essential characteristics of this invention and without departing from the spirit and scope thereof, can make various changes and modifications of the invention to adapt it to various usages and conditions. It is therefore understood that within the scope of the appended claims the invention may be practiced otherwise than as specifically described.

What is claimed is:

1. A magnetic heading sensor alignment device which comprises:

a generally cylindrical workpiece of a non-magnetic material having a first end and a second end and further having a longitudinal opening, parallel to and symmetrical to its central axis, for fitting a magnetic sensor and leads thereof inside said longitudinal opening, said cylindrical workpiece further having a plurality of grooves at the first and second ends thereof, said grooves being located on a circle with the center thereof located at the longitudinal axis of said cylindrical workpiece;

a plurality of longitudinal strips of a non-magnetic material, each member thereof having bent ends for fitting them into corresponding members of said grooves on the first and second ends of said cylindrical workpiece; and means for securing the ends of each of said plurality of longitudinal strips into respective members of said plurality of grooves at said first and second ends of said cylindrical workpiece.

2. The alignment device of claim 1 wherein said cylindrical workpiece is made of a polycarbonate.

3. The alignment device of claim 1 wherein said plurality of non-magnetic longitudinal strips are made of full hard brass.

4. The alignment device of claim 1 wherein each member of said plurality of longitudinal non-magnetic strips has a plurality of bends for providing a spring-like action thereto.

5. The alignment device of claim 4 where the number of said plurality of longitudinal non-magnetic strips is three.

* * * * *